Figure 1:
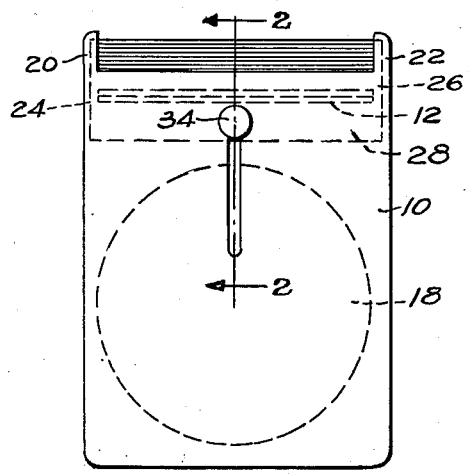

Oct. 7, 1952     F. P. WILLCOX     2,612,817
PHOTOELECTRIC EXPOSURE METER FOR INCIDENT LIGHT MEASUREMENTS
Filed Sept. 2, 1948     3 Sheets-Sheet 1

FIG. 2-A

FIG. 4-A

Inventor
Frederick P. Willcox

By Homer R. Montague
ATTORNEY

Oct. 7, 1952     F. P. WILLCOX     2,612,817
PHOTOELECTRIC EXPOSURE METER FOR INCIDENT LIGHT MEASUREMENTS
Filed Sept. 2, 1948     3 Sheets-Sheet 2
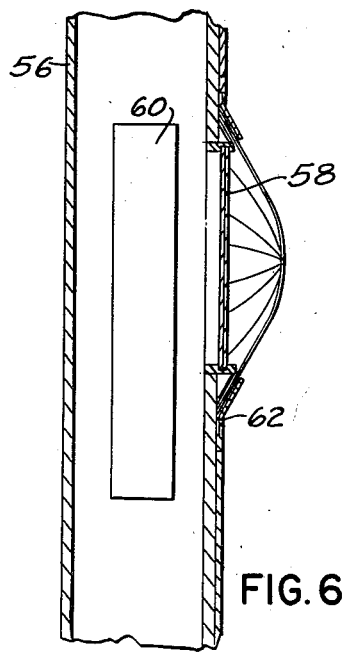
FIG. 6
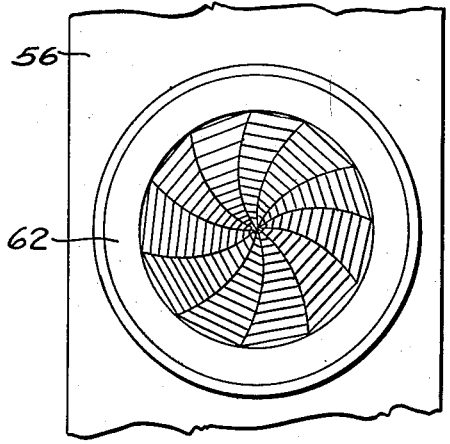
FIG. 7
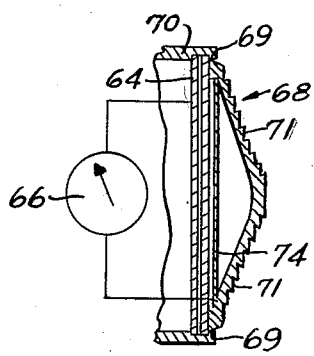
FIG. 8
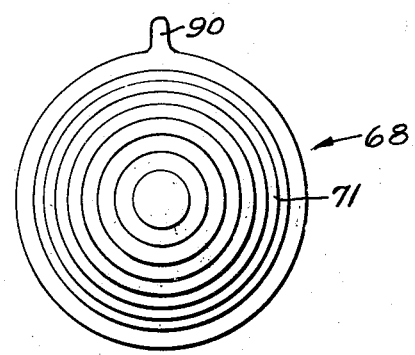
FIG. 9
FIG. 10
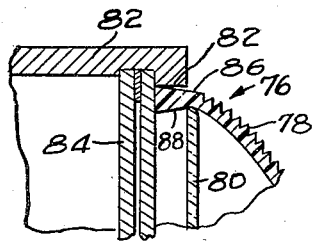
FIG. 11
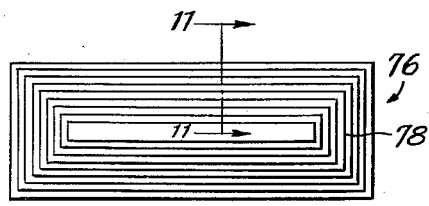
Inventor
Frederick P. Willcox
By Homer R. Montague
ATTORNEY Patented Oct. 7, 1952

2,612,817

UNITED STATES PATENT OFFICE 2,612,817

PHOTOELECTRIC EXPOSURE METER FOR INCIDENT LIGHT MEASUREMENTS

Frederick P. Willcox, Bethesda, Md.

Application September 2, 1948, Serial No. 47,424

3 Claims. (Cl. 88—23)

This invention pertains to exposure meters, particularly of the photoelectric type, and has for its principal object the provision of an exposure meter construction which can readily be changed over for use either as a reflected or as an incident light measuring instrument.

It is well known in the art of photography that the calculation or estimation of exposure values, as determined by the use of photometric instruments, can be carried out in basically different ways, known as the incident-light and the reflected light systems. In the later, and generally more common system, the exposure values are determined in terms of the irradiation of a photometric instrument located at or near the point at which the camera is situated, and directed at the scene to be recorded. A large variety of successful exposure meters have been devised for utilizing this system, which is the most simple and easily learned method of exposure determination, particularly for those who are not concerned with extremely high precision, and can rely upon film latitude to accommodate for the inherent inaccuracies which result from the failure of the exposure meter, for example, to receive radiation from precisely the same scene areas will be recorded by the camera.

Under conditions of low light intensity, or under any conditions where a greater accuracy of reading is desired, the incident light system provides certain advantages which more than offset the relatively greater difficulties in obtaining the reading or readings. As originally conceived, the incident light system consisted of reading the irradiation at a fixed distance from a reflecting surface of predetermined optical characteristics, said standard surface being held in front of, and thus subject to the same illumination as, the scene to be recorded. The advantages of and technique employed in connection with this so-called "substitution" system are fully set forth in an article by W. N. Goodwin, Jr., in the February 1933 issue of the Journal of the Society of Motion Picture Engineers, at page 110. From time to time, attempts have been made to design exposure meters which would dispense with the necessity of going through the operation of placing a separate white or matte card at the scene, by supplying the exposure meter with an integral diffuser, through which the light incident on the scene can pass and then fall upon the photoelectric cell.

It is an object of the present invention to provide an exposure meter which can be selectively used either as an incident light type meter or as a reflected light type meter, and which at the same time will be exceedingly convenient to use. This dual objective is most advantageously realized by a meter in which the special provisions necessary for incident-light work can be rendered inoperative, without in any way interfering with the handling or manipulation of the meter when used to make ordinary reflected-light readings.

A further object of the invention is to provide such an instrument in which the diffusing plate, furnished as an integral but movable part of the meter, is so arranged that the operation of moving it to use position automatically gives it an optimum configuration, of convex outer aspect, but in which it may be restored to compact, flat condition when its use is not required. In this way, the proper or best shape of the meter instrument as a whole can be made independent of the limitations which would otherwise be imposed by the desirability of a convexed profile for the diffusing element.

A further object of the invention is to provide a light diffusing and collecting structure, generally convex in shape for high light-gathering ability, but which will not increase the overall dimension of the exposure meter (in the direction of the vertex of the convex element) to an objectionable degree.

Still another object of the invention is to provide an instrument of the above type whose manufacturing cost need be only slightly greater than that of the corresponding meter not provided with the special facilities above described, and one whose operation is simple and convenient.

An additional object is to provide a separate auxiliary light collecting element adapted for convenient use with existing types of meters when it is desired to use the latter for making incident light readings.

Figure 3:
Figure 3:
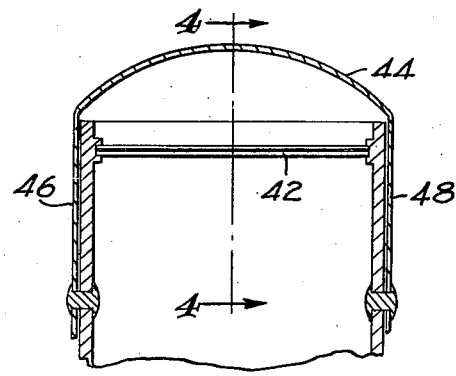
Figure 4:
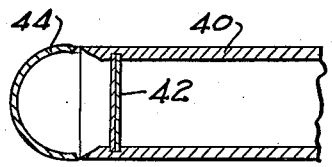
Figure 5:
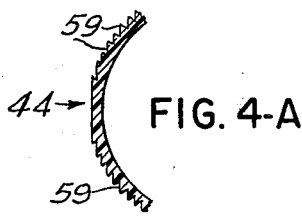
Figure 5:
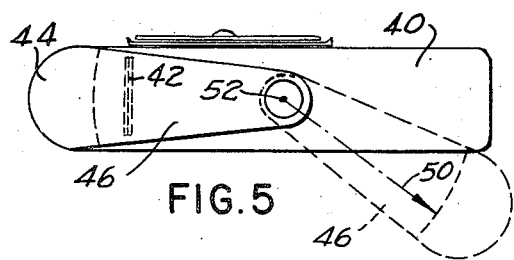
Figure 12:
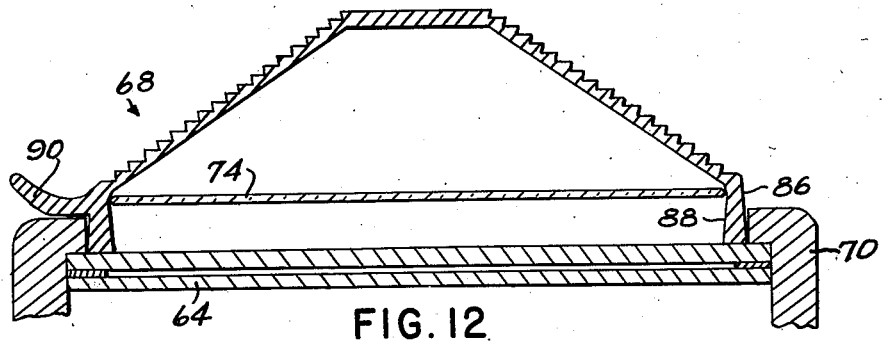
Figure 13:
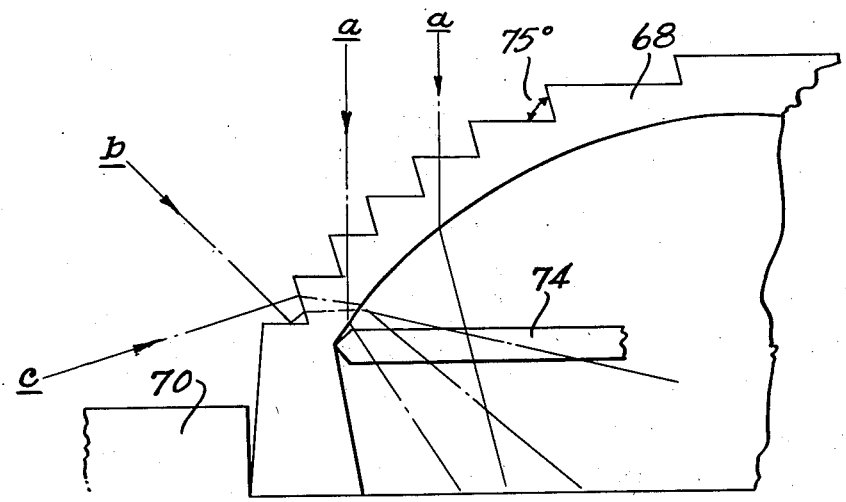

The above and other objects and advantages of the invention will best be understood from the following detailed specification of certain preferred embodiments thereof, selected for purposes of illustration, and to the details of which the invention is not to be deemed restricted. In the accompanying drawings, which form a part hereof, Fig. 1 is a plan view of a preferred form of the invention, Fig. 2 is a fragmentary sectional view taken on line 2—2 of Fig. 1, Fig. 2–A is an enlarged sectional view of a portion of Fig. 2, Fig. 3 is a fragmentary, enlarged sectional view of a second embodiment, taken on line 3—3 of Fig. 5, Fig. 4 is a fragmentary sectional view taken on line 4—4 of Fig. 5, Fig. 4-A is an enlarged sectional view of a portion of Fig. 4, Fig. 5 is a side elevational view of this embodiment, Fig. 6 is a fragmentary side view, partly broken away and in section, of a meter using a different form of diffusing element, Fig. 7 is a front view thereof, Fig. 8 is a diagrammatic view of still another form of the invention, Fig. 9 is a front view of the structure shown in Fig. 8, Fig. 10 is a front view of a modified form of the construction of Figs. 8 and 9, Fig. 11 is an enlarged fragmentary sectional view taken on line 11—11 of Fig. 10, Fig. 12 is an enlarged sectional view of a construction generally similar to that of Figs. 8 and 9, and Fig. 13 is a diagrammatic view of the geometrical relations in the diffusing element of Fig. 12.

Figure 2:
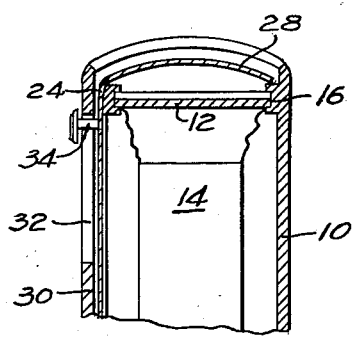

Referring now to Figs. 1 and 2 of the drawings, numeral 10 designates the preferably rectangular casing of a photoelectric exposure meter provided with the usual photoelectric cell 12 of flat configuration, connected to a galvanometer element 14. Cell 12 may be positioned adjacent an end wall or surface of the casing 10, as by being mounted in locating grooves 16 formed in the casing portions. Any desired or well known form of calculator disc or discs, designated generally by numeral 18, may be mounted on either of the major surfaces of casing 10, since the end-mounted cell and window therefor leave both of these surfaces free of interfering elements.

In order to provide for a selective operation of the exposure meter with or without a curved light-diffusing element, the end wall extensions 20 and 22, formed by the cell window which is cut back from the end of the casing, are provided with guiding grooves 24 and 26, which extend about the (here) curved extensions 20 and 22, and downwardly into the casing a sufficient distance to accommodate the entire area of the diffusing element, here shown as a relatively thin, flexible plate 28 of light diffusing material such as celluloid or other plastic, having the property of collecting and diffusing light for transmittal therethrough to the cell 12. The major surface or wall 30 of the casing, as seen in Fig. 2, is provided with a slot 32 through which passes a pin or operating button 34 secured at its inner end to the lower edge of plate 28, so that a sliding motion of the button along the slot 32 moves the plate along the guide grooves 24 and 26. In its retracted position, plate 28 is of substantially flat configuration, but when forced to follow grooves 24 and 26 it assumes a cylindrical shape which thereby enables it to receive and collect light from a relatively large solid angle and to direct the same to the active surface of cell 12, as is desirable when making measurements in the incident-light system described above. At the same time, the provision of plate 28 does not materially increase the dimensions of the casing 10, and the plate 28, when not in use, is stowed in a protected position where its surface is immune to external damage.

Flexible plate 28 may be formed of material which is of a colorless diffusing character, and it may desirably be provided with a ribbed surface, as indicated by numeral 29 in Fig. 2-A, the ribs preferably extending laterally of said plate, in the manner indicated in Fig. 1, so that their presence does not interfere with the longitudinal flexibility of the plate. Also, these ribs may desirably be somewhat rounded in cross-section (see Fig. 2-A), in order to prevent any possibility of fracture of the plate due to the formation of regions of high stress which would be the case if the ribs were sharply angled, particularly at their inner intersections.

An ordinary glass cover plate for cell 12 may be provided adjacent its forward face if desired, and this glass may incorporate the usual color filtering functions if needed for the particular spectral type of cell being employed, as well known to those skilled in this art.

In the above embodiment, the light diffusing element is obtained in curved shape by deformation of a normally flat but flexible material. Figs. 3 to 5 of the drawings illustrate a modification in which a diffusing member is given a fixed curvature, in two orthogonal azimuths, and is mounted for movement toward and away from a position overlying that end of the casing which contains the light-transmitting window of the meter. As shown in these figures, the casing 40 is again of substantially rectangular configuration, and contains a photocell 42 secured in a manner similar to that shown in Figs. 1 and 2, across the windowed narrow end of said casing. A diffusing element 44 which may be glass or, preferably, a diffusing plastic, is formed to have a generally cylindrical curvature in both side and end elevation, as shown in Figs. 3 and 4 respectively, and is carried by a pair of swinging arms 46 and 48 preferably pivoted to the side walls of casing 40 at points lying somewhat short of the mid-length thereof. That basal surface of the diffuser which mates with the end wall of the casing, and the said end of the casing, may be formed with a curvature indicated by dash line 50 in Fig. 5, which is concentric with the pivot axis 52, so that the diffuser and its frame or swinging arms may be rotated from an in-use position shown in full lines in Fig. 5 to the dotted line position of that figure, in which latter position it may conveniently be held in the cupped hand which supports the casing 40. Here again, any desired form of calculator disc assembly, numbered 54, may be provided on either of the major faces of the casing.

It will be understood that this form of the invention also includes the required galvanometer element for operation by current generated within cell 42. If desired, the swinging arms 46 and 48 may be molded integrally with the plastic diffuser element 44, with consequent saving in cost.

As best shown in the enlarged fragmentary view of Fig. 4-A, the surface of the diffusing element is preferably formed with a plurality of longitudinal ribs 59 which extend widthwise of the meter casing. Each of these ribs is formed by the intersection of two planes, one of which is substantially parallel to the surface of the photoelectric cell when the diffuser is in place before said cell, and the other of which extends at an angle of approximately 75° to the plane of the first surface. The advantages of this particular arrangement, in terms of light collection, will be more fully described in connection with later figures of the drawing.

It will be understood that this form of the invention also includes the required galvanometer element for operation by current generated within cell 42. If desired, the swinging arms 46 and 48 may be molded integrally with the plastic diffuser element 44, with consequent saving in cost. Moreover, while the ribs 59 are shown as extending entirely across the long dimension of screen 44, they may be arranged in parallel rectangular formation so that a portion of each rib is parallel to all the four sides of the screen member, in the manner illustrated in Fig. 10, to be described below.

A form of optical diffuser which is particularly adapted to photoelectric exposure meters employing a circular light sensitive element is illustrated in Figs. 6 and 7 of the drawings, in which numeral 56 is applied to the casing of such an instrument, which has a photoelectric cell 58 mounted adjacent a flat major surface of the casing, and the usual meter or current-measuring device located within the casing as at 60. In this instance, the diffuser is formed after the manner of an iris diaphragm of the type whose leaves, when moved to operative position, extend outwardly in a dome-shaped configuration as best shown in Fig. 6. The mechanical construction of such a diaphragm is clearly disclosed in the U. S. patent to W. Merte issued September 24, 1935, No. 2,015,491, and in other U. S. patents. As here applied, the diaphragm blades are controlled by an operating ring 62 for moving them from their collapsed position adjacent to and surrounding the photocell surface, to their active position as shown in Fig. 6. These blades are individually formed with ribs having the geometric properties mentioned above in connection with Fig. 4-A, and so oriented with reference to the blade bodies that when the blades are in extended, or operative positions, the ribs on adjacent blades extend in a generally circumferential direction, as illustrated in Fig. 7. This arrangement provides for a maximum collection of light which would reach the subject from various angles within, or even slightly beyond, the hemisphere within which the reading is being taken.

In order to make the advantages of the present invention applicable to existing meters which are not provided with any special arrangements for the collection of light into the photoelectric cell during incident light measurements, I have devised an arrangement of a snap-in type of light collector, one form of which is illustrated in Figs. 8 and 9 of the drawing. In Fig. 8, the photocell 64 and indicating meter element 66 of a conventional exposure meter are shown in a simple series connection, and a flat cone-shaped light collector 68 is shown snapped into place with its peripheral edge engaging the window defining edges 69 of the casing 70. The shape of element 68 is that of a flattened cone, and the clear or milky plastic or equivalent material of which it is formed is provided with a number of concentric light collecting ridges 71. Element 68 is dimensioned to have a snug fit within the window area of casing 70, and its inner wall may be provided with a circular groove or the like adapted to retain a snap-in neutral tint or colored filter 74 whose transmission factor is adjusted to give proper meter readings when the device is used for taking incident light readings, as the large solid angle from which light is collected would otherwise result in readings of excessive magitude.

Figs. 10 and 11 illustrate a similar snap-in device of rectangular profile, generally designated 76, and provided with rectangular light collecting ridges 78 parallel to one another and to the periphery of said device at all points thereof. As best shown in Fig. 11, this element 76 may contain a filter 80 similar to element 74 of Fig. 8, and an entire snap-in assembly may be inserted within the rectangular cell aperture of a casing 82 of an exposure meter whose photoelectric cell is indicated at 84. As shown in this figure, the marginal portion of element 76 may be defined by inclined surfaces 86 and 88, the former establishing a desired snapped engagement with casing 82 and the latter serving to retain filter element 80 in its proper position.

Figs. 12 and 13 are enlarged views of the flat cone-like element of Figs. 8 and 9 in which the geometrical configuration of the light collecting or prismatic ridges is shown, each prismatic element being defined by a plane substantially parallel to the plane of the photoelectric cell and by an intersecting plane lying at an angle of about 75° thereto. In order to provide for ready removal of the snap-in unit 68 from the window opening of the meter with which it is used, a small finger piece 90 may be formed integrally with the material of the collector 68.

As best shown in Fig. 13, rays of light proceeding from the object perpendicular to the cell surface, such as the rays labeled $a$, are transmitted through filter 74 to the photocell in the usual manner except for the slight refraction which occurs at the boundaries of element 68. Rays of light such as the ray $b$, proceeding laterally toward the meter, will reach the photocell surface after reflection from those prism surfaces which lie parallel to the cell surface. A certain amount of light proceeding from behind the normal theoretical acceptance hemisphere of the photocell, such as indicated by ray $c$, will also be caught and redirected toward the cell surface by refraction at the prism faces which are inclined at the approximately 75° angle to the photocell plane.

Inasmuch as the diffusing and collecting element is, as described and shown, of relatively flat configuration, its vertex height is substantially less than would be the case, for example, if a hemispherical element were used, and the flattened element can hence be applied to new or existing exposure meters without increasing the overall bulk thereof to an objectionable degree. At the same time, the configuration is truly convex, which I have found to be desirable for accurate representation of the light incident upon the screen being measured.

It will be seen from the above that I have provided various ways and means for rendering a photocell reading responsible to components of incident light which are normally lost when taking incident light readings, while at the same time provision has been made for insuring that the total amount of light collected does not produce an unduly high meter reading.

In accordance with the patent statutes I have described herein certain preferred embodiments of my invention, but I wish it to be understood that the specific terms used and the details disclosed are exemplary only, and that many changes and modifications are possible without departing from the spirit of my invention as defined in the appended claims.

I claim:

1. A photoelectric exposure meter comprising a substantially rectangular casing having one of its end walls formed to provide a window opening, a rectangular photoelectric cell disposed in said window opening, an indicating instrument mounted in said casing and connected with said cell, means adjacent said one end wall defining curved guides extending along two opposite edges of said window opening, a sheet of flexible, light-transmitting and diffusing material mounted in said guides for movement between a first position in which it overlies said cell in a configuration convexly curved in one meridianal direction about an axis parallel to the long dimension of said cell, and diffusing the light incident on said cell, and a second position in which it lies flat within the confines of said casing to one side of said cell and out of the path of light reaching said cell, and operating means for sliding said sheet between said respective positions.

2. A photoelectric exposure meter in accordance with claim 1, in which said sheet of diffusing material has one surface ribbed with the rib axes extending parallel to the long dimension of said cell.

3. A photoelectric exposure meter in accordance with claim 1, in which the curved guides have a curvature such that the sheet, when in its curved condition, has a vertex height substantially less than that corresponding to a hemicylindrical element of the same base width.

FREDERICK P. WILLCOX.

REFERENCES CITED

The following references are of record in the file of this patent:

UNITED STATES PATENTS

| Number | Name | Date |
|---|---|---|
| 333,408 | Hale | Dec. 29, 1885 |
| 1,571,019 | Lucas | Jan. 26, 1926 |
| 1,984,004 | Wildhaber | Dec. 11, 1934 |
| 1,990,361 | Bailey | Feb. 5, 1935 |
| 2,247,763 | Meyers | July 1, 1941 |
| 2,278,338 | Tonnies | Mar. 31, 1942 |
| 2,330,877 | Fleisher et al. | Oct. 5, 1943 |
| 2,389,617 | Freund | Nov. 27, 1945 |
| 2,467,304 | Gannon | Apr. 12, 1949 |
| 2,504,346 | Norwood | Apr. 18, 1950 |